July 29, 1930. J. O. CADIEUX Re. 17,751

TELEPHONE

Original Filed June 1, 1928 4 Sheets-Sheet 1

INVENTOR
Joseph O. Cadieux,
BY
Robert S. Allen
ATTORNEY

July 29, 1930. J. O. CADIEUX Re. 17,751

TELEPHONE

Original Filed June 1, 1928 4 Sheets-Sheet 2

INVENTOR
Joseph O. Cadieux,
BY
Robert S. Allen
ATTORNEY

July 29, 1930. J. O. CADIEUX Re. 17,751

TELEPHONE

Original Filed June 1, 1928 4 Sheets-Sheet 3

INVENTOR

Joseph O. Cadieux,

BY

Robert Stillman

ATTORNEY

July 29, 1930. J. O. CADIEUX Re. 17,751

TELEPHONE

Original Filed June 1, 1928 4 Sheets-Sheet 4

INVENTOR
Joseph O. Cadieux,
BY
ATTORNEY

Reissued July 29, 1930

Re. 17,751

UNITED STATES PATENT OFFICE

JOSEPH O. CADIEUX, OF MERIDEN, CONNECTICUT, ASSIGNOR, BY MESNE ASSIGNMENTS, TO CONNECTICUT TELEPHONE & ELECTRIC CORPORATION, OF MERIDEN, CONNECTICUT, A CORPORATION OF DELAWARE

TELEPHONE

Original No. 1,717,091, dated June 11, 1929, Serial No. 282,102, filed June 1, 1928. Application for reissue filed June 9, 1930. Serial No. 460,071.

My invention relates particularly to what are sometimes termed apartment house telephones.

One object is to provide a construction which can be readily installed and wired.

Another object is to provide a construction which is compact and yet capable of connection and use in a variety of different ways.

Another object is to provide a construction of the character described which can be economically made and assembled.

Another object is to provide a telephone of this character having a receiver with cord extension, but without any protruding hook or stud.

Another object is to provide an insulating support for the transmitter, bell, receiver switch, push buttons and all the electrical connections therefor.

Another object is to provide a construction of the above character which can be readily plugged into and removed from wall connections without the use of binding posts, screws, or the like.

In the preferred form the apparatus comprises a casing or housing composed of two parts, namely, a wall or supporting back member and a front or detachable body member. The back member carries a series of stationary jaws or sockets which are electrically connected to the house wiring system, and the front member carries the transmitter, the bell, the push buttons, the receiver switch and all the necessary connections, together with blades adapted to be plugged into the sockets. One of the parts has a flange serving to laterally surround the transmitter, vibrator, switches and electrical connections.

Figure 1:
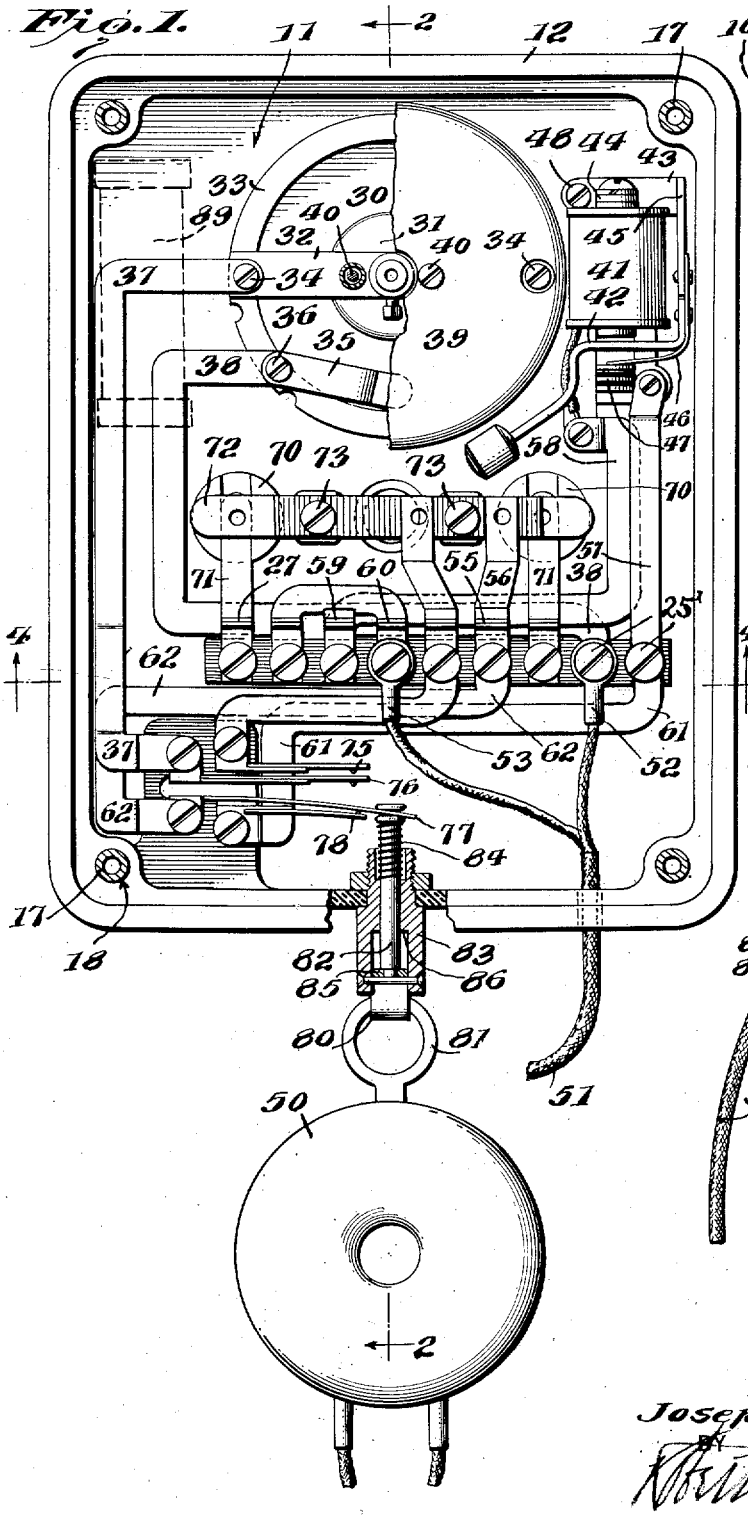
Fig. 1 is a rear view of the front part of one form of construction embodying my invention showing the bell partly broken away and showing the receiver suspended from the hook switch.
Figure 2:
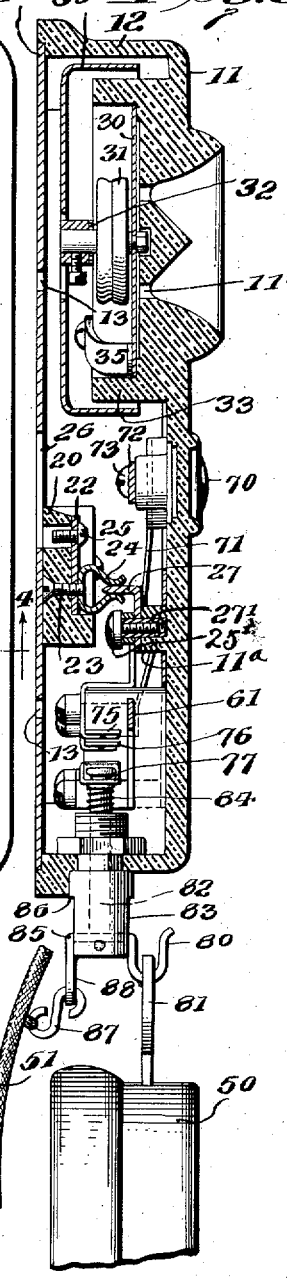
Fig. 2 is a vertical sectional view on the plane of the line 2—2 of Fig. 1 showing the receiver suspended from the hook beneath the casing.
Figure 3:
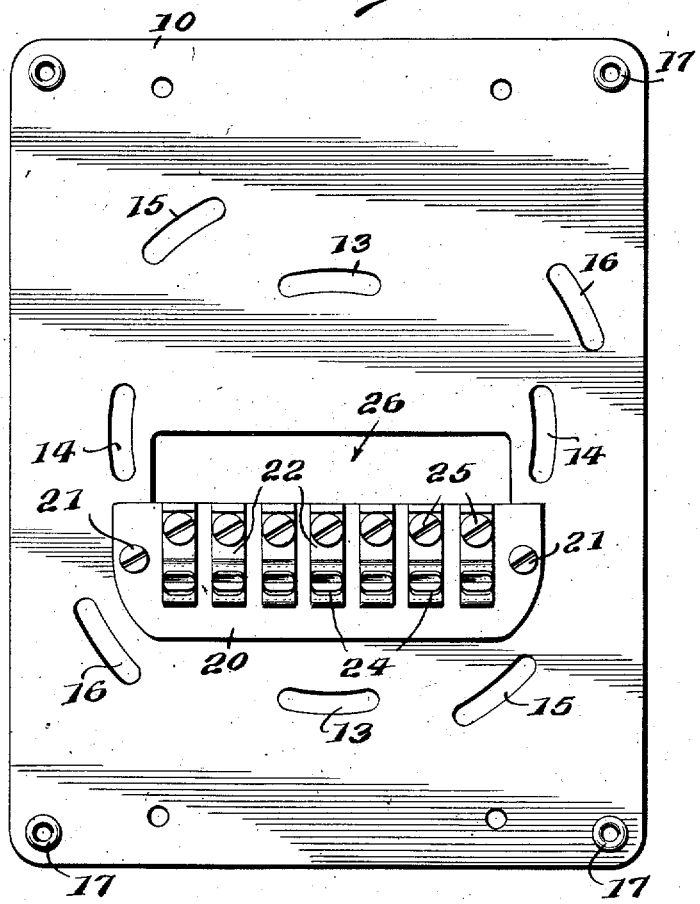
Fig. 3 is a front view of the back part or plate of the construction shown in Fig. 2, the front part being omitted or removed.
Figure 5:
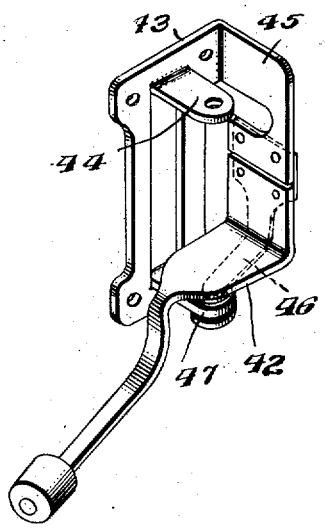
Fig. 5 is a perspective view of the frame of the vibrator and its armature.
Figure 4:
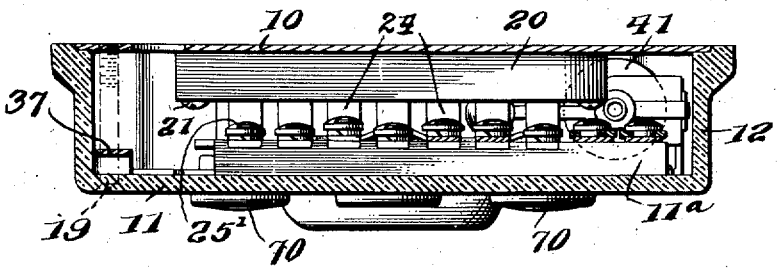
Fig. 4 is a horizontal sectional view on the plane of the line 4—4 of Fig. 1, the back plate and attached parts being shown associated therewith.
Figure 6:
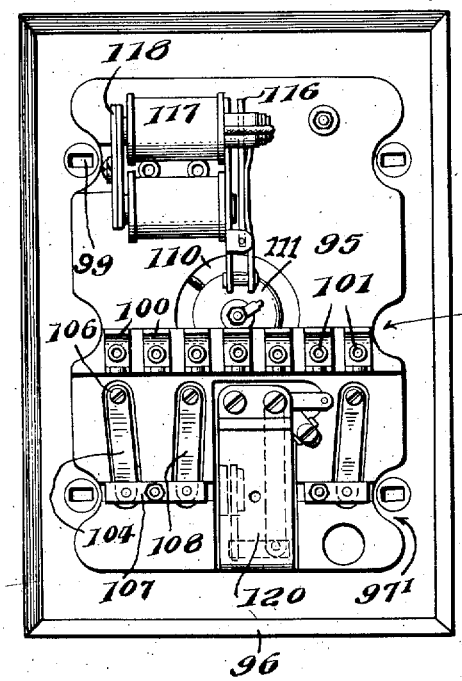
Fig. 6 is a rear view of the front member of a modified form of construction.
Figure 7:
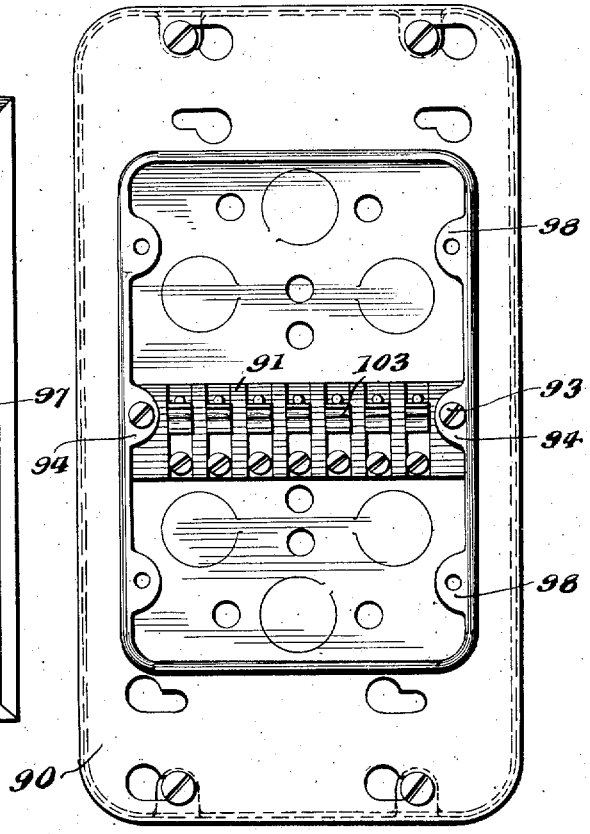
Fig. 7 is a front view of the back member with which the member of Fig. 6 is adapted to be associated.
Figure 8:
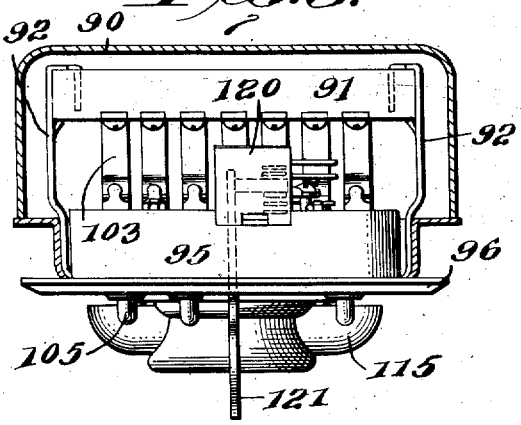
Fig. 8 is a horizontal section and end view of the device of Figs. 6 and 7 associated looking upwardly.
Figure 9:
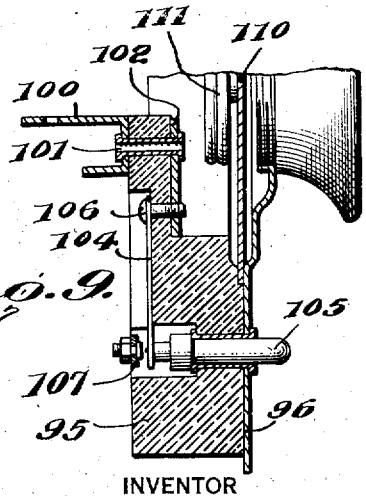
Fig. 9 is a vertical sectional view of a fragment of the construction of Fig. 6 on a larger scale.
Figure 10:
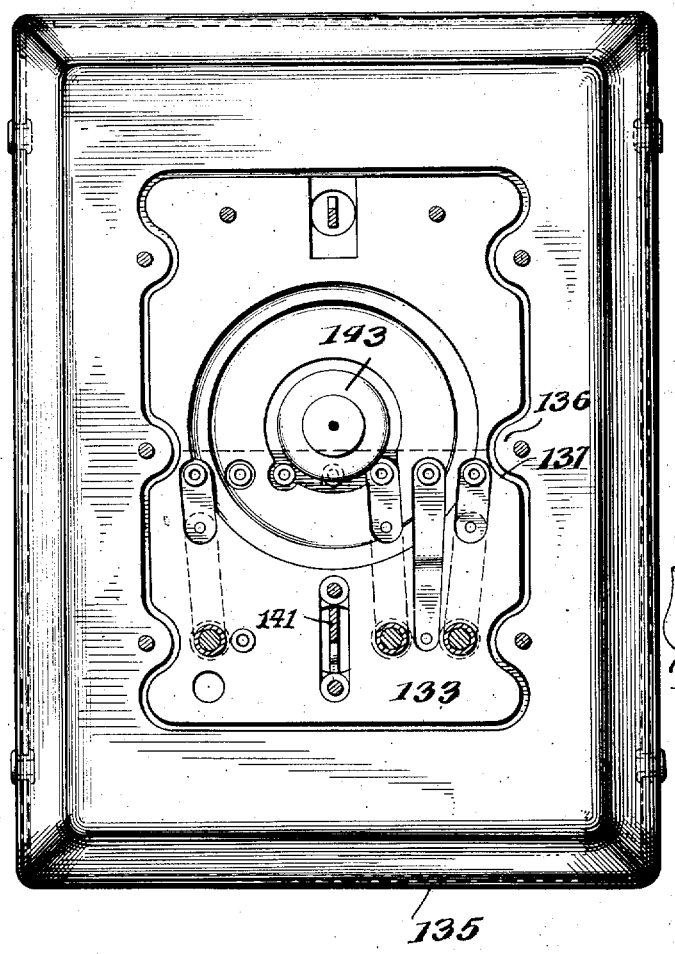
Fig. 10 is a front view of another form of construction embodying electrical and insulating features of Fig. 6 and showing parts in section on the plane of the line 10—10 of Fig. 11.
Figure 11:
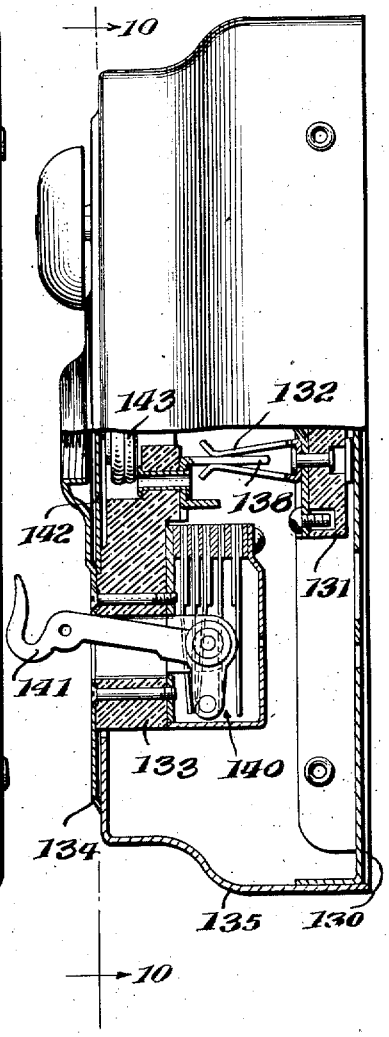
Fig. 11 is a side view and partial section of the construction shown in Fig. 10 with the face plate in place.

In the construction shown on Sheets 1 and 2, the back plate 10 and the front plate 11, together with the wall 12 constitute the receptacle or casing. In this case the back plate is formed of metal and provided with a number of pairs of slots 13, 14, 15 and 16 to facilitate the connection of the back plate by means of screws to any of the usual forms of outlet boxes commonly employed when the house wiring is to be concealed. The elongation of these slots permits a considerable degree of angular rotation so as to enable the telephone box to be installed vertically even though the outlet box may be somewhat tilted or displaced. The back and front members of the casing are provided with interfitting guide members such as the posts 17 and the sockets 18 so that the parts of the casing may be brought into their proper relative positions when installed. The parts may be secured together by screws 19 passing through the face plate into the posts 17. Although I have shown the casing of the conventional rectangular form it is obvious according to my invention that the casing might be made of any shape.

The outer or front plate may be formed integrally with the surrounding flange or wall 12 or separate, as will be seen in the forms shown in Sheets 3 and 4.

For wiring purposes I provide an insulating block 20 which is secured in a suitable manner to the back plate, for instance, by screws 21. This block carries a series of terminal plates 22 each of which is secured in place by a screw such as 23, which also serves to anchor a spring jaw or socket member 24. Each plate has a binding screw 25 or other means of securing a line terminal. There will be as many of these terminal plates and sockets or contact jaws as there are circuit connections to be made with the telephone. The back plate is provided with an opening 26 to admit the circuit wires (not shown).

The front member 11 in turn carries a number of contact terminal blades 27, to correspond with and fit the sockets or jaw member 24. Each of these blades 27 is suitably anchored to the insulation by a collar, screw, rivet or other similar device 27′ embedded in a rib 11ᵃ of the insulation. These blades and sockets are so located and dimensioned that they come into engagement automatically after the positioning members 17 and 18 have been brought into alignment. The result is that there is no possibility of improperly connecting the blades and sockets since the interlocking and aligning members must first coact properly.

The telephone transmitter preferably has a diaphragm member 30 and a microphonic device 31 which may be of suitable construction. The microphonic element 31 may be connected to the diaphragm and supported by a cross bar 32 on the flange 33 and held in place by screws 34.

The front plate 11 preferably has openings 11′ for the passage of sound waves in a simulated mouth piece. The diaphragm is pressed by a contact spring or springs 35 which is anchored, for instance, by a screw 36. These screws 34 and 36 may also serve to anchor the conducting strips 37 and 38.

In back of the diaphragm 30 and surrounding the flange 33 is mounted the bell or alarm device 39 which may be secured to the cross bar 32 by one or more screws 40, thus in effect providing a chamber behind the diaphragm 30. In case the diaphragm 30 is omitted the openings 11′ serve to pass the sound vibrations of the bell 39. The vibrator is preferably made as a completely assembled unit adapted to be inserted in the casing. This unit comprises a coil 41 with an armature 42 and supported by a frame 43. This frame has a lug 44 which is directly connected with the core of the coil. The flange 45 supports the armature 42 through the medium of the spring member 46 which also serves as the movable part of the vibrator contact, the stationary part being secured to the lug 47 of the frame. This frame may be secured, for instance, by one or more screws 48 so that the vibrator may be readily installed or removed.

The receiver 50 may be of any suitable construction and its diaphragm may conveniently serve as a buzzer of the call system as will be hereinafter understood.

This receiver has the usual cord 51 with terminals 52 and 53 suitably anchored and electrically connected in the casing. In the form shown in the terminal 52 is connected by the strip 38 and contact 35 to the diaphragm 30. The other terminal 53 is connected to contact blade 60. One vibrator terminal is connected by strip 57 to strip 61 and switch contact 78. The other terminal of the vibrator coil is connected by a strip 58 to the blade 59.

A number of push button switches may be provided depending upon the installation desired, for instance, to open a front door of the building or to call the janitor or for other purposes. These push button switches are preferably arranged in line and each may consist of a button 70, a spring arm 71, and a stationary contact or bus bar 72. This stationary member 72 may be common to two or more of the push button switches and may be anchored by one or more screws or rivets 73. The stationary end of each spring arm 71 is suitably anchored to the insulation and is connected to one of the blades such as 27 of the plug-in connection or attachment. Strip 62 is connected to contact blade 55 and the latter by strip 56 to bus bar 72.

The so-called hook switch may be of any suitable character, for instance, having contacts 75 and 76 which are normally separated, and the contacts 77 and 78 normally connected. The stationary ends of these contact springs are suitably anchored and insulated from each other and connected to the appropriate points by strips or wires, for instance, 76 is connected to 37, 77 is connected to 62 and thence to 55, and 78 is connected to 61. These flat conductors ensure accurate and permanent connections without the use of loose wires or soldering.

In order to avoid projecting studs or hooks such as are commonly employed in telephones of this character I have provided a special hook 80 mounted beneath the casing on which the usual eye 81 of the receiver may be hung. This hook is carried by a plunger 82 which is reciprocable in a bushing 83 secured in the bottom wall of the casing. The upper end of this plunger is loosely connected to the outer end of the contact spring 77 so that the weight of the receiver normally holds the two contacts 77 and 78 together. The spring 84 on the inner end of the plunger 82 is sufficiently strong to raise the contact 77 and press it against the contact 76 and the latter against the contact 75 when the receiver 50 is taken off the hook for the purpose of listening. The shank 85 of the hook stops against the shoulder 86 in this upward movement. The cord 51 is connected by a link 87 to the rear end 88 of the hook so that the hook switch will be automatically drawn down to the normally inactive position in case the receiver has not been returned to the hook in the proper way.

Other forms of hook switches may be employed for certain purposes. Obviously an induction coil 89 may be used in modifications of this construction herein set forth.

Preferably all the conducting parts are secured by anchorage members such as 27′ so as to avoid the use of separate insulating strips, bushings and washers.

A row of binding screws 25′ is provided for convenience in attaching the various conducting strips or other wires such as the receiver terminals 52, 53.

In the form of the invention shown on Sheet 3 a rear member 90 of the casing is in the form of an outlet box intended to be mounted in the wall with its outer edge flush with the surface of the wall as is customary in structures of this character. The wire terminals and stationary contacts for effecting the electrical connections with the telephone instrument are all mounted on the insulating cross bar 91 which is supported by straps 92 and screws 93 which pass through lugs 94 in the front of the box.

The front member of the casing is made up of a body part 95 and a plate 96 which together carry the transmitter, the receiver, the vibrator, the hook switch, and the push button and the necessary electrical connections. The part 95 is preferably formed of insulation and has grooves 97, 97′ which correspond with the projecting lugs 94, 98 at the edges of the opening of the box so that the front member is properly directioned when inserted into the box. The part 95 may be secured to the part 96 in any suitable manner. The front plate and the attached insulating member 95 is secured in position by screws (which are not shown) which pass through the openings 99 into screw seats in the lugs 98.

The contact blades 100 are anchored to the insulating body 95 for instance by means of tubular rivets 101 which also anchor the strap members 102. These blades 100 are adapted to coact with the contact jaws or sockets 103 which are carried by the insulating cross bar 91. The lengths of the blades 100 and the sockets 103 are such that they do not come into contact with each other until after the lugs 94, 98 and grooves 97, 97′ are in engagement. The spring contact 104 for the push button 105 is connected by screw 106 to the strap 102. The bar 107 serves as the stationary contact for the contact springs 104 and 108.

The diaphragm 110 and microphone device 111 are mounted in a recess between the body 95 and plate 96 and suitably connected to the appropriate plug blades and switch contacts.

In this case the bells 115 are mounted on the front and the ringing armature 116 is operated by the electro-magnet 117 at the rear. The latter is supported by a frame 118 which is secured to the insulating body in any suitable manner.

In this form of construction the telephone switch 120 is secured to the back of the insulating block 95 and operated by the hook lever 121 which projects through the front of the plate. Although the receiver is not shown in this figure it should be understood that any suitable form may be employed and that it would be connected in the circuit in the usual manner.

In the form shown on Sheet 4 the casing is intended to be mounted on the outer face of the wall. The back plate 130 is secured to the wall and carries the insulating block 131 with the socket contacts 132. The front part of the casing consists of the insulating block 133 and the front plate 134. In this form all of the live parts are surrounded by a flange 135 which is a part of the casing and secured to the back plate 130. This wall 135 has inturned flanges with lugs 136 which coincide with grooves 137 in the sides of the insulating block 133 so as to bring the parts into proper alignment. The contact blades 138 are secured to the insulating body 133 in any suitable manner and connected to the appropriate elements of the telephone transmitter, receiver, vibrator and push button switches.

The switch 140 may be of any suitable character and operated by the hook lever 141 in the usual manner. The transmitter diaphragm 142 and microphonic device 143 are also secured to the front member of the casing.

It will be seen from the foregoing that in each form of the invention as herein illustrated the wall member or back part of the casing can be installed and wired into the house line very readily even before the telephone instrument is available. After the wiring is completed the front part of the casing is readily inserted and secured in place without requiring any wiring to be done. Reversely the front part of the casing can be readily removed and all the electrical connections and devices readily inspected without connecting or disconnecting any wires.

Obviously the casing may be made of any suitable material and built up of any number of parts. It is most desirable however that the back part or plate which is secured to the wall be formed of metal and that such part of the front member as directly carries the conducting members be formed of insulating material. It is also preferred that all the movable parts be mounted in back of or behind the plane of the face plate so as to afford a neat appearance and have as few projecting parts as possible.

I contemplate that other forms of plug-in connecting guides and contacts may be employed within the spirit and scope of my invention.

It should also be understood that the same construction may be used for various circuit arrangements with and without bells by simply changing the connecting strips (for instance in Fig. 1) and the connections between the bus bar 72 and the various plug blades or the like. The receiver diaphragm may be used as a buzzer by using an interrupter in the circuit at the point from which the call is to be made as set forth in my application 459,143 filed June 4, 1930.

The construction of the casing with the transmitter diaphragm and micriphone device concentric with the concealed signal bell is claimed in my application #359,123 filed April 29, 1929.

The means for supporting the resilient switch contact fingers and their circuit terminals together with a modified form of operating receiver hook are claimed in my application #359,124 filed April 29, 1929.

The forms shown in Figs. 6 to 11 are claimed specifically in my application #459,807 filed June 7, 1930.

I claim:

1. A telephone comprising a back member adapted to be secured to a wall, an insulating block carried thereby, circuit terminals on said block, a front member detachably connected to the back member and having an insulating part, a transmitter, a receiver and a hook switch carried by said insulating part and automatically engaging contacts carried by said insulating part and said block and connected respectively to said transmitter, receiver and hook switch.

2. A telephone comprising a casing having back and front members, the back member being adapted to be secured to a wall, circuit terminals carried by said back member, the front member being detachably connected to the back member and having a transmitter, a receiver and a hook switch and automatically engaging contacts carried by said front and back members and connected respectively to said transmitter, receiver and hook switch.

3. A telephone comprising a back member having a series of sockets, a front member having contacts adapted to said sockets, a transmitter and receiver carried by the front member, said back member and said front member having interfitting aligning members coacting with each other during the insertion of the contacts into the sockets.

4. A telephone comprising a back member having a series of sockets, a front insulating body having contacts adapted to said sockets, a transmitter and receiver carried by the insulating body, said back member and said body having interfitting aligning members coacting with each other in advance of the insertion of the contacts into the sockets.

5. A telephone comprising a back member having a series of sockets, a front member having contacts adapted to said sockets, a transmitter and receiver carried by the front member, said back member and said front member having interfitting aligning members coacting with each other during the insertion of the contacts into the sockets and means for securing the front and back members together.

6. A telephone comprising a back member having contacts, a front member having contacts to coact therewith, a bus bar carried by the front member and connected to some of the front contacts and a plurality of spring arms coacting with said bus bar, each arm having a push button.

7. A telephone comprising a casing composed of a back member having contacts and a front member having contacts to coact therewith, a bus bar carried by the front member and connected to some of the front contacts and a plurality of spring pressed push buttons coacting therewith.

8. A telephone comprising a wall casing containing a transmitter and a switch, a switch hook operating entirely beneath said casing and a receiver adapted to engage said hook and having a cord connected to said hook.

9. A telephone comprising a wall casing containing a transmitter and a switch, a spring-pressed plunger depending from said switch beneath said casing and a receiver adapted to engage said plunger and having a cord connected thereto.

10. A telephone construction comprising a wall plate having a plurality of pairs of oppositely disposed slots for receiving means for attaching the plate to various types of outlet boxes, contact members carried by said plate and a front plate adapted to be secured to the back plate and carrying the transmitter and contacts connected thereto and coacting with the contacts on the back plate.

11. In a telephone construction, an insulating body, a hook switch having contact members secured thereto, a transmitter mounted in said body, cord terminals secured to said body, and preformed flat conducting strips connecting the respective elements according to a predetermined circuit arrangement.

12. In a telephone construction, an insulating body, a series of contacts and terminals carried thereby, a receiver cord secured to some of said terminals, a hook switch connected to some of said terminals, a bus bar secured to said body and connected to one of said terminals and a push button connected to one of said terminals and adapted to contact with said bus bar.

13. A telephone instrument comprising a casing having back and front members, the back member being adapted to constitute a wall support, circuit terminals carried by said back member, means for detachably connecting the front member to the back member, the front member having interior connections for a transmitter, a receiver and a switch and automatically engaging contacts carried by said front and back members and connected respectively to said transmitter, receiver and switch terminals on the front member and to the terminals on the back member.

14. A telephone instrument comprising a back member adapted to be supported on a wall and having a series of contacts and wiring terminals associated therewith, a front member having a series of contacts adapted to automatically engage said other contacts in a predetermined arrangement, a transmitter and a receiver having terminals carried by the front member and connected to said contacts on the front member, said back member and said front member having interfitting aligning members coacting with each other and means for detachably securing the front member to the back member with the respective contacts in engagement.

15. In a telephone construction, a wall plate, an insulating body thereon having contacts, a detachable front member having contacts adapted thereto, a hook switch having contact members secured to the front member, a transmitter and a receiver connected to said switches, cord terminals secured to said front member, and preformed flat conducting strips connecting the respective elements on the front member according to a predetermined circuit arrangement.

16. In a telephone instrument, a casing having front and back members, the latter member constituting a support, each having a number of circuit terminals and a number of contacts connected to but projecting therefrom, the contacts on the two members being slidably connected with each other when the front member is applied to the back member and a number of switches in the casing having stationary spring pressed contacts with exposed push buttons, the stationary switch contacts being connected to some of the terminals in the front member of the casing and the movable switch members being connected to other terminals in the front member, a transmitter and a receiver connected to contacts on the front member and means for securing the front and back members together.

17. In a telephone instrument of the character described, a casing consisting of front and back members the latter constituting a support and having circuit terminals and connected contacts and the front member having projecting contacts at its rear adapted to have slidable engagement with the contacts on the front member, receiver and transmitter elements electrically connected to the contacts carried by the front of the casing and screws passing thru one of the members and having screw seated connections with the other member for holding the parts of the casing together with the contacts in proper relation.

18. A telephone instrument comprising a casing having front and back members, circuit terminals and contacts carried by the back member, a bell and vibrator therefor mounted in the front member, transmitter and receiver terminals within the front member, contacts carried by the front member and connected to said latter terminals and to said vibrator and means for detachably securing the front member to the back member.

19. A telephone instrument comprising a supporting member, a series of projecting contacts supported thereby but insulated therefrom, each contact having a terminal for external circuit connection, a detachable front member having contacts on its rear adapted to slidably engage the contacts on the supporting member, and a transmitter, a receiver, and a hook switch having terminals carried by the front member and connected respectively to contacts on the front member, and means for connecting the front member to the supporting member with the respective contacts in engagement, one of the members having a flange surrounding the other member and laterally surrounding the various terminals and contacts.

JOSEPH O. CADIEUX.